United States Patent [19]

Culbertson

[11] 4,113,700
[45] Sep. 12, 1978

[54] PROCESS FOR PREPARING HIGH ORTHO NOVOLAC RESINS

[75] Inventor: Harry M. Culbertson, Belchertown, Mass.

[73] Assignee: Monsanto Company, St. Louis, Mo.

[21] Appl. No.: 758,370

[22] Filed: Jan. 10, 1977

[51] Int. Cl.$^2$ .................................................. C08G 8/10
[52] U.S. Cl. ..................................... 528/138; 528/140; 528/143; 528/139; 528/165
[58] Field of Search ........................................ 260/57 A

[56] References Cited

U.S. PATENT DOCUMENTS

| 3,332,911 | 7/1967 | Huck | 260/57 A |
|---|---|---|---|
| 3,476,707 | 11/1969 | Culbertson | 260/57 A |

OTHER PUBLICATIONS

J. Appl. Chem., Dec., 1957, Fraser et al., pp. 676–688.
Chem. Abstracts, vol. 73, 1970, 124163g, Bessiere.
Partansky, Am. Chem. Soc. Preprints, 1967, pp. 115–124.

*Primary Examiner*—Howard E. Schain
*Attorney, Agent, or Firm*—Joseph S. Nelson; William J. Farrington; James C. Logomasini

[57] ABSTRACT

The invention relates to an improved process for preparing high ortho novolac resins, said process including reacting phenol and formaldehyde in the presence of a divalent electropositive metal oxide, hydroxide or organic salt wherein the improvement comprises conducting said reaction with said catalysts in combination with a divalent electropositive metal salt selected from the group consisting of sulfonates and fluoroborates or acids selected from the group consisting of sulfonic and fluoroboric or mixtures thereof.

8 Claims, No Drawings

PROCESS FOR PREPARING HIGH ORTHO NOVOLAC RESINS

BACKGROUND OF THE INVENTION

Conventional novolac resins, prepared from phenolic compounds such as phenol and a source of formaldehyde, in the presence of strong acid catalysts such as sulfuric acid or hydrochloric acid or oxalic acid, are characterized by having a preponderance of para/para and ortho/para methylene bridges as illustrated below.

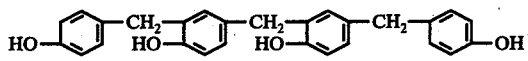

whereas the so-called "high ortho" novolac resins are characterized by having mostly ortho/ortho methylene bridges as illustrated below:

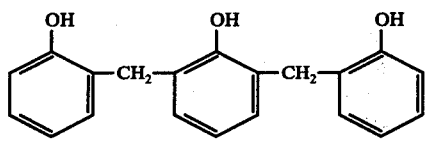

the main advantage of the "high ortho" novolac resins being the much greater speed of cure when reacted with hexamethylenetetramine. "High ortho" novolac resins are commonly prepared by reacting phenolic compounds such as phenol and a source of formaldehyde in the presence of either a divalent metal oxide (e.g. MgO and ZnO) or an organic acid salt of a divalent metal (e.g. zinc acetate or magnesium acetate) catalyst system. This invention relates to the production of so-called "high ortho" novolac resins, which are identifiable as being heat-hardenable phenol-formaldehyde resins of enhance hardening speed.

U.S. Pat. No. 3,476,707 by H. M. Culberton has disclosed that in the production of novolac resins, a catalyst system comprising (1) an oxide or hydroxide or organic acid salt of a divalent electropositive metal, and (2) a halogen acid or halide of a divalent electropositive metal, is particularly effecting in promoting "high ortho" orientation in the formation of the resins, with a significant increase in yield and lowering of processing temperature.

Such high ortho novolac resins have ortho orientation of from about 50 to 75% being produced under aqueous conditions.

It has now been discovered that high ortho resins can be produced having high ortho orientation of from about 75 to 100% in an improved process. The invention relates to an improved process for preparing very high ortho novolac resins, said process including reacting phenol and formaldehyde in the presence of a divalent electropositive metal oxide, hydroxide or organic salt wherein the improvement comprises conducting said reaction with said catalysts in combination with a divalent electropositive metal salt selected from the group consisting of sulfonates and fluoroborates or acids selected from the group consisting of sulfonic and fluoroboric or mixtures thereof. Such very high ortho novolacs have the technical advance of being heat-hardenable with greatly enhanced hardening rates as bonding resins.

SUMMARY OF THE INVENTION

The present invention relates to an improved process for the production of phenol-aldehyde novolac resins of the class which is characterized by having a preponderance of ortho/ortho methylene bridges and which is prepared by an acid aqueous reaction mixture containing a material selected from the group consisting of phenol and metaalkylphenols in molar excess with a source of formaldehyde, conductint said reacting in the presence of a catalyst comprising:
(A) a divalent electropositive metal compound selected from the group consisting of oxides, hydroxides and organic acid salts or mixtures thereof wherein the improvement comprises conducting said reacting with said catalyst in combination with,
(B) a divalent electropositive metal salt selected from the group consisting of sulfonates and fluoroborates or,
(C) acids selected from the group consisting of sulfonic and fluoroboric and mixtures thereof, said reacting being carried out under aqueous conditions.

PREFERRED EMBODIMENTS

DIVALENT ELECTROPOSITIVE METAL COMPOUNDS

Divalent electropositive metals of oxides or hydroxides or organic acid salts employed in accordance with the invention, can be calcium (Ca++), barium (Ba++), strontium (Sr++), magnesium (Mg++), zinc (Zn++), manganous (Mn++) and cobaltous (Co++) cobalt and lead (Pb++).

Sulfonic acids employed in accordance with the invention are the aryl sulfonic, e.g., p-toluene, benzene, xylene, phenol and naphthalene. Other acids are the alkyl sulfonic, e.g., methane, ethane, trifluoromethane, etc. Acids such as fluoroboric may be used.

The organic acids or organic acid salts of acetic, formic, benzoic and lactic acid may be used in the catalyst system.

An example of a particular effective catalyst system is a mixture of zinc oxide, manganous acetate and magnesium methane sulfonate ($Mg(CH_3SO_3)_2$). An equally effective alternative is a mixture of zinc oxide, phenolsulfonic acid, manganese acetate and zinc acetate. The catalyst system can comprise the oxide or hydroxide or organic salt and a sulfonate of a different divalent electropositive metal. When an organic acid salt is employed it can be a salt of an aliphatic monocarboxylic acid such as formic acid or acetic acid. The salt can be derived from a hydroxycarboxylic acid such as lactic or a salt of an aromatic carboxylic acid such as benzoic. Typical salts useful in the catalyst system are calcium formate, zinc acetate, magnesium acetate, manganous acetate, lead acetate and zinc benzoate. The magnesium organic acid salts as the magnesium sulfonates have been found to be particularly effective when used in combination with zinc oxide. Generally, the preferred catalyst system comprises the sulfonates and/or sulfonic acids in combination with zinc oxide.

The effectiveness of the catalyst system according to the invention varies with respect to solubility limitations of the oxides or hydroxides or salts and the sulfonates and with respect to their ability to direct the condensation of the formaldehyde with the phenol or meta-alkylphenol, the relative amount of (1) oxide or hydroxide or salt, and (2) sulfonic acid or sulfonate as well as the total amount employed varying according to solubility and the necessity to maintain the pH in the pH 4 to pH 7 range. In general, the amount of oxide or hydroxide or salt, calculated as percentage based on the amount of phenol or meta-alkylphenol, is within the range of 0.1 to 2.0%, the preferred amount being within 0.2 to 0.5%; in general the amount of sulfonate, calculated as percentage based on the amount of phenol or meta-alkylphenol, is within the range of 0.05 to 2.0%, the preferred amount being within 0.1 to 1.0%; and in general the amount of sulfonic acid, calculated as percentage (100% acid) based on the amount of phenol or meta-alkylphenol, is within the range of 0.02 to 1.0%, the preferred amount being within 0.05 to 0.25%.

Meta-alkylphenols as well as phenol, form fast-curing novolac resins when reacted with a source of formaldehyde in accordance with the invention, the phenol and meta-alkylphenol materials including the commercial materials commonly used for the production of such resins. The source of formaldehyde includes conventional formalin solutions for the purpose, as well as materials such as paraformaldehyde, which produce formaldehyde under the conditions of the condensation reaction. The molar ratio of phenol to formaldehyde generally lies between 1.20:1 and 2:1, the preferred range being 1.25:1 to 1.45:1. The excess is kept above 1.20:1 in order to prevent gelation and is generally below 2:1 for economic reasons, another factor influencing the choice of molar excess being the molecular weight range generally desired for the resin.

Preparation of "high ortho" novolac resins in accordance with the invention is seen to be essentially a three stage process, the first stage being the formation of methylol derivatives as illustrated by the following:

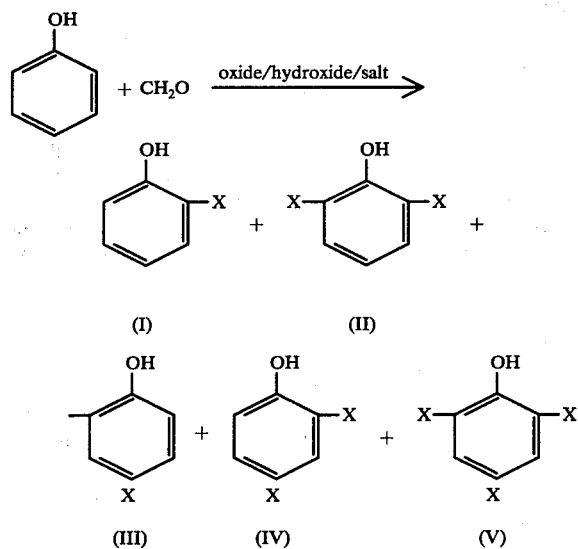

wherein X is CH OH. With the presence of the divalent oxides at pH of pH 4–7, orientation of methylols is predominantly ortho (structures I and II), whereas at pH greater than pH 7, the amount of para substitution increases and an appreciable amount of trimethylol (structure V) derivative is formed. In the second stage the formation of benzyl ethers takes place as illustrated by the following:

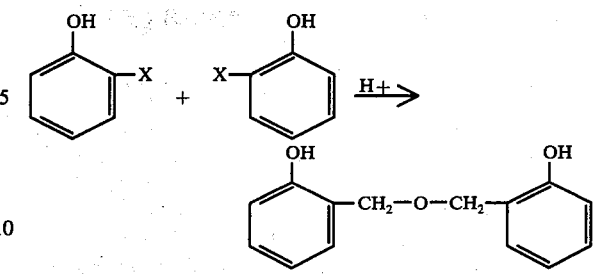

wherein X is CH OH, this reaction taking place only under mildly acidic conditions (pH 4 up to pH 7). In the third stage the formation of methylene bridges takes place through the breaking down of the benzyl ether and reaction with excess phenol which is present, and the condensation of free methylols, as illustrated by the following:

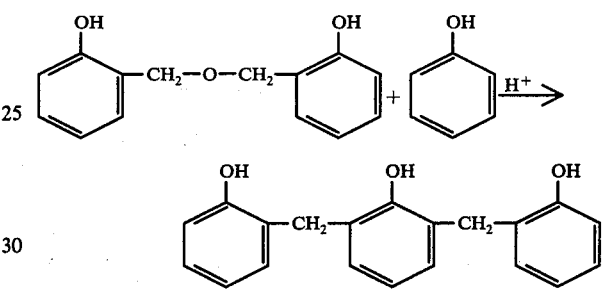

and I consider that it is in the third stage that the divalent metal sulfonate or sulfonic acid effects a particularly valuable function. The stability of the benzyl ethers is quite pronounced, thus when the prior art organic acid salts or oxides are employed alone, which materials probably are present in the form of the phenate salts, temperatures of up to 160° C. are required. On the other hand, we have found that the presence of the sulfonate or sulfonic acid catalyzes the decomposition of the benzyl ethers at temperatures as low as 115° C. The pH range specified above is critical in this reaction, since if greater than pH 7, a base-catalyzed condensation takes place, with poor control of orientation and possible gelation at the lower phenol/formaldehyde ratios, whereas if the pH is below pH 4, the orientation is predominantly para, with subsequent loss of reactivity of the resin.

The relation of the above sequence of reactions to the actual processing steps described in the practical examples can be summarized as follows: Stage 1 (methylolation)-initial 3 hours reflux; Stage 2 (ether formation)-dehydration to 125° C.; and Stage 3 (condensation)-reflux at 125° C., in all cases a mixture of oxide or hydroxide or salt and sulfonate being present whether the sulfonate is added in the form of the metal sulfonate or the sulfonic acid. The role of the metal oxide or hydroxide or salt in the catalyst system is therefore seen to by (1) control of pH in the presence of the strong acids, and (2) increase in the concentration of metal ions which catalyze the initial stage (methylolation) of the reaction and control orientation in the initial and subsequent reaction stages. The role of the sulfonate is seen to (1) increase in the concentration of metal ions, as above, and most importantly, (2) catalyze the decomposition of the intermediate ether at much lower temperatures.

These novolacs have a total ortho orientation of 75 to 100% which distinguishes them from conventional high ortho novolacs which have an ortho orientation of 50–75%. The very high ortho orientation results in a much more linear polymer with unusual and valuable properties.

Synthesis of these novolacs is carried out by reacting phenol and formaldehyde at elevated temperatures in the presence of a carefully controlled amount of a catalyst mixture. This catalyst system is a combination of oxides and sulfonates or oxide, sulfonates and acetates of certain divalent electropositive metals.

The following examples are illustrative only and are not intended to limit the scope of the invention.

EXAMPLES 1 – 6

In Examples 1–6 the following procedure was used. Phenol, catalyst and a 50% by weight aqueous solution of formaldehyde were charged and heated to reflux. After 3 hours of reflux 10 parts of xylene/100 parts phenol was added and the mixture distilled. The distillate vapors upon cooling separated into two layers and the lower (aqueous) layer was drawn off and the upper (xylene) layer returned to the reaction vessel. The water was removed over a 3 hour period with the temperature gradually rising to 140°–155° C. When no further water evolution occured the mixture was vacuum distilled to remove xylene and excess phenol to an end temperature of 145° C. and 28 inches Hg vacuum. The resin was then poured out to cool and solidify. Table I tabulates the formulations, reaction conditions and analysis of each resin.

EXAMPLE 7

Phenol, catalyst and xylene (10 parts/100 parts phenol) were charged to the reaction vessel and heated to 105° C. A 50% by weight aqueous solution of formaldehyde was added at the rate of 0.43 parts per minute during which time the water concentration increases to 12%. This concentration was maintained through distillation of a xylene-water mixture in which the water phase was drawn off and the xylene phase returned to the vessel as described in Examples 1 through 6. Upon completion of the formaldehyde addition, water was removed over a period of 3 hours until the temperature reached 140° C. The mixture was then distilled under vacuum to remove xylene and excess phenol to an end temperature of 140° C. and 28 inches Hg vacuum. At this point the resin was removed from the vessel and cooled. See Table I for analysis.

EXAMPLE 8

Phenol, catalyst and xylene (10 parts/100 parts phenol) were charged to the reaction vessel and heated to 108° C. A 50% by weight aqueous solution of formaldehyde was added at the rate of 0.38 parts per minute during which time the water concentration increased to 10%. This concentration was maintained through distillation as in Example 7. Upon completion of the formaldehyde addition the resin was dehydrated and finished as in Example 7. See Table I for analysis.

The ortho content of the novel novolac resins is determined by gas-liquid chromatography of the trimethylsilyl derivatives of the dimeric components; 2,2′-dihydroxydiphenylmethane, 2,4′-dihydroxydiphenylmethane and 4,4′-dihydroxydiphenylmethane. The ortho orientation is obtained as a ratio of the relative amounts of these components as follows:

$$\text{ortho orientation} = \frac{\text{amount of 2,2}' + \frac{1}{2}\text{ amount of 2,4}'}{\text{total amount of dimeric components}}$$

TABLE I

| Example | Phenol/ Formaldehyde | Catalyst Weight % on Phenol | % Water | Reflux Temp. C° | Reflux Time (hrs.) | Yield % on Phenol | Ortho Content |
|---|---|---|---|---|---|---|---|
| 1 | 1.39:1 | 0.1 ZnO, 0.20 Mn(OAc)$_2$, 0.11 Mg (CH$_3$SO$_3$)$_2$ | 16.3 | 103° | 3 hours | 98.7 | 88% |
| 2 | 1.33:1 | 0.1 ZnO, 0.1 Mn(OAc)$_2$, 0.2 PTSA*, 0.4 Zn(OAc)$_2$ | 16.2 | 103° | 3 hours | 99.9 | 80% |
| 3 | 1.33:1 | 0.2 ZnO, 0.1 Mn(OAc)$_2$ 0.2 PhSA**, 0.4 Zn(OAc)$_2$ | 16.2 | 103° | 3 hours | 100.2 | 75% |
| 4 | 1.33:1 | 0.1 ZnO, 0.1 Mn(OAc)$_2$, 0.1 CH$_3$SO$_3$H, 0.4 Zn(OAc)$_2$ | 16.2 | 103° | 3 hours | 100.3 | 79% |
| 5 | 1.33:1 | 0.1 ZnO, 0.2 Mn(OAc)$_2$, 0.1 CH$_3$SO$_3$H, 0.3 Co(OAc)$_2$ | 16.2 | 102° | 3 hours | 99.8 | 83% |
| 6 | 1.39:1 | 0.1 ZnO, 0.4 Mn(OAc)$_2$ 0.1 CH$_3$SO$_3$H | 15.8 | 103° | 3 hours | 96.3 | 87% |
| 7 | 1.23:1 | 0.1 ZnO, 0.4 Zn(OAc)$_2$ 0.2 PTSA, 0.1 Mn(OAc)$_2$ | 12.0 | 105° | 2 hours | 101.5 | 76% |
| 8 | 1.39:1 | 0.1 ZnO, 0.2 Mn(OAc)$_2$, 0.11 Mg(CH$_3$SO$_3$)$_2$ | 10.0 | 108° | 2 hours | 94.1 | 97% |

*PTSA Paratoluenesulfonic Acid
**PhSA Phenolsulfonic Acid

What is claimed is:

1. In a process for the production of phenol-aldehyde novolac resins of the class which is characterized by having a preponderance of ortho/ortho methylene bridges and which is prepared by an acid aqueous reaction mixture containing a material selected from the group consisting of phenol and metaalkylphenols in molar excess with a source of formaldehyde, conducting said reacting in the presence of a catalyst comprising:
   (A) a divalent electropositive metal compound selected from the group consisting of oxides, hydroxides and organic acid salts selected from the group consisting of formates, lactates, acetates and benzoates or mixtures thereof wherein the improvement comprises conducting said reacting with said catalyst in combination with
   (B) a divalent electropositive metal salt selected from the group consisting of sulfonates and fluoroborates or
   (C) acids selected from the group consisting of sulfonic and fluoroboric and mixtures thereof, said reacting being carried out under aqueous reflux conditions, with a phenol to formaldehyde molar ratio of about 1.20:1 to 2.0:1, said ortho/ortho methylene bridges being present in an amount of 75 to 100%.

2. A process of claim 1 wherein said catalyst is used in combination with sulfonic or fluoroboric acid.

3. A process of claim 1 wherein said catalyst is used in combination with a divalent metal sulfonate or fluoroborate salts.

4. A process of claim 1 wherein said divalent electropositive metal is magnesium ($Mg^{++}$), zinc ($ZN^{++}$) or manganous ($Mn^{++}$), calcium ($Ca^{++}$), barium ($Ba^{++}$), cobaltous ($Co^{++}$) and lead ($Pb^{++}$).

5. A process of claim 1 wherein the amount of said catalyst is in the range of about 0.1 to 2.0% by weight, the amount of said acids are within the range of 0.05 to 1.0% by weight or the amount of said sulfonate and fluoroborate salts are in the range of from about 0.2 to 1.0% by weight each based on the weight of phenol or meta-alkylphenol.

6. A process of claim 1 wherein said reacting is carried out in the presence of greater than about 5% water based on said reaction mixture.

7. A process of claim 1 wherein said water is present in amounts of from about 6 to 50% by weight based on said reaction mixture.

8. A process of claim 1 wherein said divalent electropositive metal is magnesium ($Mg^{++}$), zinc ($Zn^{++}$) or manganous ($Mn^{++}$).